US011292877B2

(12) United States Patent
Yamanaka et al.

(10) Patent No.: US 11,292,877 B2
(45) Date of Patent: Apr. 5, 2022

(54) AMORPHOUS POLYAMIDE RESIN AND MOLDED ARTICLE

(71) Applicant: Mitsubishi Gas Chemical Company, Inc., Tokyo (JP)

(72) Inventors: Masaki Yamanaka, Hiratsuka (JP); Tomonori Kato, Hiratsuka (JP); Hatsuki Oguro, Hiratsuka (JP); Nobuhide Tsunaka, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 44 days.

(21) Appl. No.: 16/487,373

(22) PCT Filed: Feb. 6, 2018

(86) PCT No.: PCT/JP2018/004030
§ 371 (c)(1),
(2) Date: Aug. 20, 2019

(87) PCT Pub. No.: WO2018/155171
PCT Pub. Date: Aug. 30, 2018

(65) Prior Publication Data
US 2020/0062901 A1 Feb. 27, 2020

(30) Foreign Application Priority Data

Feb. 21, 2017 (JP) .............................. JP2017-029943

(51) Int. Cl.
*C08G 69/26* (2006.01)
*C08L 77/06* (2006.01)
(52) U.S. Cl.
CPC ........... *C08G 69/26* (2013.01); *C08G 69/265* (2013.01); *C08L 77/06* (2013.01); *C08J 2377/06* (2013.01)
(58) Field of Classification Search
CPC .. C08G 69/265; C08G 69/26; C08G 18/2825; C08L 77/06; C08J 2377/06
See application file for complete search history.

(56) References Cited

U.S. PATENT DOCUMENTS

| | | | | |
|---|---|---|---|---|
| 3,294,759 | A * | 12/1966 | Gabler | C08G 69/265 528/339 |
| 3,882,085 | A | 5/1975 | Schmitt et al. | |
| 4,377,683 | A | 3/1983 | Pfeifer et al. | |
| 5,094,777 | A | 3/1992 | DiPietro | |
| 6,103,006 | A | 8/2000 | DiPietro | |
| 6,277,911 | B1 * | 8/2001 | Torre | C08G 69/26 524/538 |
| 2007/0154827 | A1 | 7/2007 | Suzuki et al. | |
| 2010/0203275 | A1 | 8/2010 | Hoffmann et al. | |
| 2011/0244381 | A1 | 10/2011 | Suzuki et al. | |
| 2014/0127440 | A1 * | 5/2014 | Norfolk | C08K 3/04 428/36.92 |
| 2014/0221600 | A1 | 8/2014 | Sroeks et al. | |
| 2015/0225505 | A1 | 8/2015 | Blondel et al. | |
| 2016/0145390 | A1 | 5/2016 | Schmidt et al. | |

FOREIGN PATENT DOCUMENTS

| | | |
|---|---|---|
| CN | 101030049 A | 9/2007 |
| CN | 101796099 A | 8/2010 |
| CN | 102047185 A | 5/2011 |
| CN | 103804902 A | 5/2014 |
| CN | 104211953 A | 12/2014 |
| EP | 0542669 A1 | 5/1993 |
| EP | 2767555 A1 | 8/2014 |
| JP | S57-030725 A | 2/1982 |
| JP | H05-125276 A | 5/1993 |
| JP | H05-320416 A | 12/1993 |
| JP | 2002-501963 A | 1/2002 |
| JP | 2010-285553 A | 12/2010 |
| JP | 6071828 B2 | 11/2012 |
| JP | 2014-523942 A | 9/2014 |
| JP | 2015-528521 A | 9/2015 |
| JP | 2016-528312 A | 9/2016 |
| TW | 201522502 A | 6/2015 |

OTHER PUBLICATIONS

International Preliminary Report on Patentability and Written Opinion for PCT/JP2018/004030, dated May 1, 2018, and English Translation submitted herewith (14 pages).
International Search Report for PCT/JP2018/004030, dated May 1, 2018, and English Translation submitted herewith (5 pages).
Office Action dated Apr. 19, 2021, in corresponding Chinese Patent Application No. 201880012830.2.
Dolden, John G., "Structure-property relationships in amorphous polyamides," Oct. 1976, Polymer, vol. 17, pp. 875-892.
Office Action dated Jul. 19, 2021, in corresponding Taiwanese Patent Application No. 107105103 (8 pages).

* cited by examiner

*Primary Examiner* — Gregory Listvoyb
(74) *Attorney, Agent, or Firm* — Fitch, Even, Tabin & Flannery LLP

(57) ABSTRACT

Provided is an amorphous polyamide resin that has a small weight change rate under hot and humid conditions and that can maintain a good appearance even when formed into a molded article and placed under hot and humid conditions. Also provided is a molded article including the amorphous polyamide resin. An amorphous polyamide resin includes: constituent units derived from a diamine and constituent units derived from a dicarboxylic acid, not less than 70 mol % of the constituent units derived from a diamine being constituent units derived from isophoronediamine, the constituent units derived from a dicarboxylic acid including constituent units derived from an α,ω-straight chain aliphatic dicarboxylic acid having from 8 to 14 carbons and constituent units derived from an aromatic dicarboxylic acid.

17 Claims, 3 Drawing Sheets

AMORPHOUS POLYAMIDE RESIN AND MOLDED ARTICLE

CROSS-REFERENCE TO RELATED APPLICATIONS

This application is a U.S. national phase application filed under 35 U.S.C. § 371 of International Application Number PCT/JP2018/004030, filed Feb. 6, 2018, designating the United States, which claims priority from Japanese Application Number 2017-029943, filed Feb. 21, 2017.

Field of the Invention

The present invention relates to a novel amorphous polyamide resin and a molded article. In particular, the present invention relates to an amorphous polyamide resin that has a small weight change percentage under hot and humid conditions and that can maintain a good appearance even when formed into a molded article and placed under hot and humid conditions, and relates to a molded article that uses the amorphous polyamide resin.

Background of the Invention

In recent years, amorphous polyamide resins formed by polycondensation of diamines and dicarboxylic acids have been investigated.

For example, Patent Document 1 discloses a heat-resistant polyamide resin including a diamine component including not less than 40 mol % of bis(aminomethyl)cyclohexane and a dicarboxylic acid component including not less than 50 mol % of isophthalic acid and/or terephthalic acid.

CITATION LIST

Patent Literature

Patent Document 1: JP 2010-285553 A

SUMMARY OF INVENTION

An amorphous polyamide resin is a transparent resin and has high chemical resistance and, therefore, is usually used in films, sunglasses, and the like. In addition to these characteristics, a crystalline polyamide resin tends to form a burr easily when formed into a molded article, whereas an amorphous polyamide resin has the advantage of reduced occurrence of burr formation even if the amorphous polyamide resin is formed into a molded article. In exploring wider application of the amorphous polyamide resin, in recent years, there has been a demand for the amorphous polyamide resin to have a small weight change percentage under hot and humid conditions and to maintain a good appearance without cracking, deforming, or the like even when formed into a molded article and placed under hot and humid conditions.

In order to solve such problems, an object of the present invention is to provide a polyamide resin that is an amorphous polyamide resin, that has a small weight change percentage under hot and humid conditions, and that can maintain a good appearance even when formed into a molded article and used under hot and humid conditions, and is also to provide a molded article including the amorphous polyamide resin.

Based on the above problems, the problems described above are solved by the following means <1>, preferably by <2> to <10>.

<1> An amorphous polyamide resin which comprises constituent units derived from a diamine and constituent units derived from a dicarboxylic acid, wherein not less than 70 mol % of the constituent units derived from a diamine are constituent units derived from isophoronediamine; and the constituent units derived from a dicarboxylic acid include constituent units derived from an α,ω-straight chain aliphatic dicarboxylic acid having from 8 to 14 carbons and constituent units derived from an aromatic dicarboxylic acid.

<2> The amorphous polyamide resin according to <1>, wherein the constituent units derived from a dicarboxylic acid include from 30 to 80 mol % of the constituent units derived from an α,ω-straight chain aliphatic dicarboxylic acid having from 8 to 14 carbons and from 70 to 20 mol % of the constituent units derived from an aromatic dicarboxylic acid.

<3> The amorphous polyamide resin according to <1> or <2>, wherein the constituent units derived from an α,ω-straight chain aliphatic dicarboxylic acid having from 8 to 14 carbons include at least one selected from the group consisting of constituent units derived from sebacic acid and constituent units derived from dodecanedioic acid.

<4> The amorphous polyamide resin according to any one of <1> to <3>, wherein the constituent units derived from an aromatic dicarboxylic acid include at least one selected from the group consisting of constituent units derived from 2,6-naphthalene dicarboxylic acid and constituent units derived from isophthalic acid.

<5> The amorphous polyamide resin according to <1>, wherein not less than 90 mol % of the constituent units derived from a diamine are the constituent units derived from isophoronediamine; the constituent units derived from a dicarboxylic acid include from 30 to 80 mol % of the constituent units derived from an α,ω-straight chain aliphatic dicarboxylic acid having from 8 to 14 carbons and from 70 to 20 mol % of the constituent units derived from an aromatic dicarboxylic acid; the constituent units derived from an α,ω-straight chain aliphatic dicarboxylic acid having from 8 to 14 carbons include at least one selected from the group consisting of constituent units derived from sebacic acid and constituent units derived from dodecanedioic acid; and the constituent units derived from an aromatic dicarboxylic acid include at least one selected from the group consisting of constituent units derived from 2,6-naphthalene dicarboxylic acid and constituent units derived from isophthalic acid.

<6> The amorphous polyamide resin according to any one of <1> to <5>, wherein, in the constituent units derived from a dicarboxylic acid, a ratio of the constituent units derived from an α,ω-straight chain aliphatic dicarboxylic acid having from 8 to 14 carbons to the constituent units derived from an aromatic dicarboxylic acid (the constituent units derived from an α,ω-straight chain aliphatic dicarboxylic acid having from 8 to 14 carbons/the constituent units derived from an aromatic dicarboxylic acid) is from 0.5 to 3.5.

<7> The amorphous polyamide resin according to any one of <1> to <6>, wherein a glass transition temperature of the amorphous polyamide resin is from 130 to 220° C.

<8> The amorphous polyamide resin according to any one of <1> to <7>, which has a notched charpy impact strength in accordance with JIS K 7111-1 of 2.5 kJ/m² or greater.

<9> The amorphous polyamide resin according to any one of <1> to <8>, wherein a melt viscosity measured at a shear rate of 122 sec$^{-1}$ and a measurement temperature of 280° C. is from 200 to 2300 Pa·s.

<10> A molded article obtainable by molding a composition including the amorphous polyamide resin described in any one of <1> to <9>.

According to the present invention, a polyamide resin that is an amorphous polyamide resin having a small weight change percentage under hot and humid conditions and being capable of maintaining a good appearance even when formed into a molded article and placed under hot and humid conditions, and a molded article including the amorphous polyamide resin can be provided.

DESCRIPTION OF EMBODIMENTS

Figure 1:
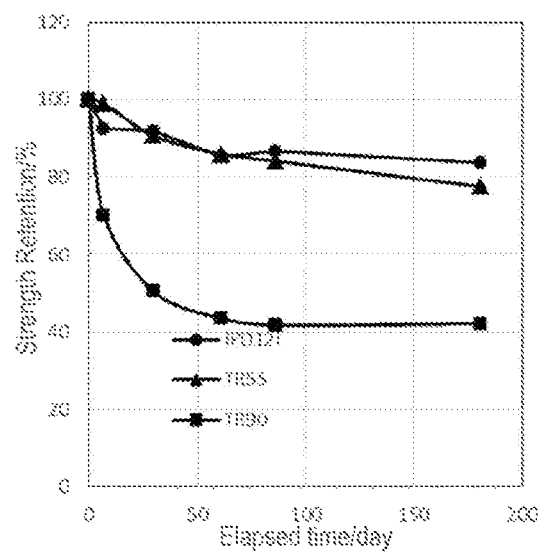
FIG. 1 is a diagram showing chemical resistance to toluene.

The contents of the present invention will be described in detail below. Note that "(from) . . . to . . . " as used herein means that the numerical values described before and after as the lower limit value and the upper limit value are included.

The amorphous polyamide resin of the present invention is characterized in that it comprises constituent units derived from a diamine and constituent units derived from a dicarboxylic acid, wherein not less than 70 mol % of the constituent units derived from a diamine are constituent units derived from isophoronediamine; and the constituent units derived from a dicarboxylic acid include constituent units derived from an α,ω-straight chain aliphatic dicarboxylic acid having from 8 to 14 carbons and constituent units derived from an aromatic dicarboxylic acid. With such a composition, an amorphous polyamide resin can be obtained that has a small weight change percentage under hot and humid conditions and can maintain a good appearance without deforming, cracking, or the like even when formed into a molded article and placed under hot and humid conditions.

As for the mechanism, it is assumed that amorphous form is achieved by the use of isophoronediamine and low water absorption is achieved by increasing the chain length of the α,ω-straight chain aliphatic dicarboxylic acid so that water is less likely to be absorbed and thus the change in weight under hot and humid conditions is suppressed.

Furthermore, it is possible to obtain an amorphous polyamide resin having a low melt viscosity and, in particular, a melt viscosity at 280° C. of 200 Pa·s or greater. In addition, it is also possible to obtain an amorphous polyamide resin having a high glass transition temperature and particularly a glass transition temperature of 130° C. or higher. Generally, although an increased chain length of α,ω-straight chain aliphatic dicarboxylic acid tends to lower the glass transition temperature, it is presumed that, in an embodiment of the present invention, a high glass transition temperature can be achieved by the use of isophoronediamine even if the chain length of the α,ω-straight chain aliphatic dicarboxylic acid is increased.

Furthermore, the molded article formed from the amorphous polyamide resin of an embodiment of the present invention can have excellent mechanical strength, such as flexural strength and Charpy impact strength, while achieving the performance described above as well.

As a result, while taking advantages of the amorphous polyamide resin, such as formation of less burrs when the amorphous polyamide resin is formed into a molded article, the molded article can be used in applications requiring high temperature and high humidity environment, such as applications requiring low water absorption and dimensional stability. Furthermore, amorphous polyamide resins generally exhibit high viscosity and tend to have low fluidity, but the amorphous polyamide resin of an embodiment of the present invention may have a low melt viscosity, that is, the fluidity can be increased, thus may exhibit excellent moldability and extrusion processability.

In the amorphous polyamide resin of an embodiment of the present invention, not less than 70 mol %, preferably not less than 80 mol %, more preferably not less than 90 mol %, even more preferably not less than 95 mol %, and yet even more preferably not less than 99 mol %, of the constituent units derived from a diamine are the constituent units derived from isophoronediamine.

Examples of the diamine other than isophoronediamine include aliphatic diamines, such as 1,3-bis(aminomethyl)cyclohexane, 1,4-bis(aminomethyl)cyclohexane, tetramethylenediamine, pentamethylenediamine, hexamethylenediamine, octamethylenediamine and nonamethylenediamine; aromatic diamines, such as p-phenylenediamine, m-xylylenediamine, and p-xylylenediamine; and the like. One type or two or more types of these other diamines may be used.

In the amorphous polyamide resin of an embodiment of the present invention, the constituent units derived from a dicarboxylic acid include the constituent units derived from an α,ω-straight chain aliphatic dicarboxylic acid having from 8 to 14 carbons and the constituent units derived from an aromatic dicarboxylic acid.

Preferably from 30 to 80 mol %, more preferably from 45 to 80 mol %, even more preferably from 60 to 80 mol %, and yet even more preferably from 65 to 80 mol % of the constituent units derived from a dicarboxylic acid are the constituent units derived from an α,ω-straight chain aliphatic dicarboxylic acid having from 8 to 14 carbons.

Furthermore, preferably from 70 to 20 mol %, more preferably from 55 to 20 mol %, even more preferably from 40 to 20 mol %, and yet even more preferably from 35 to 20 mol % of the constituent units derived from a dicarboxylic acid are the constituent units derived from an aromatic dicarboxylic acid.

In the amorphous polyamide resin of an embodiment of the present invention, only one type or two or more types of each of the α,ω-straight chain aliphatic dicarboxylic acid having from 8 to 14 carbons and the aromatic dicarboxylic acid may be used. When two or more types are used, the total amount is preferably within the range described above.

In an embodiment of the present invention, of the constituent units derived from a dicarboxylic acid, the total amount of the constituent units derived from an α,ω-straight chain aliphatic dicarboxylic acid having from 8 to 14 carbons and the constituent units derived from an aromatic dicarboxylic acid is preferably 90 mol % or greater, more preferably 95 mol % or greater, and even more preferably 99 mol % or greater.

The α,ω-straight chain aliphatic dicarboxylic acid having from 8 to 14 carbons is preferably an α,ω-straight chain aliphatic dicarboxylic acid having from 8 to 12 carbons. Examples of the α,ω-straight chain aliphatic dicarboxylic acid having from 8 to 14 carbons include suberic acid, azelaic acid, sebacic acid, 1,9-nonanedicarboxylic acid, and dodecanedioic acid, and at least one of sebacic acid or dodecanedioic acid is preferable.

Examples of the aromatic dicarboxylic acid include terephthalic acid, isophthalic acid, 1,3-naphthalenedicarboxylic acid, 1,4-naphthalenedicarboxylic acid, 1,8-naphthalenedicarboxylic acid, and 2,6-naphthalenedicarboxylic acid. At least one type of isophthalic acid, 1,3-naphthalenedicarboxylic acid, 1,4-naphthalenedicarboxylic acid, 1,8-naphthalenedicarboxylic acid, or 2,6-naphthalenedicarboxylic acid is preferable, and at least one of 2,6-naphthalenedicarboxylic acid or isophthalic acid is more preferable. As an example of an embodiment of the amorphous polyamide resin of the present invention, a form substantially free of constituent units derived from terephthalic acid is illustrated. "Substantially free" means that the proportion of the constituent units derived from terephthalic acid is 5 mol % or less, preferably 3 mol % or less, and more preferably 1 mol % or less, of the constituent units derived from a dicarboxylic acid constituting the amorphous polyamide resin of an embodiment of the present invention.

Examples of the dicarboxylic acid (other dicarboxylic acid), other than the α,ω-straight chain aliphatic dicarboxylic acid having from 8 to 14 carbons and the aromatic dicarboxylic acid, include α,ω-straight chain aliphatic dicarboxylic acids having 8 carbons or less (e.g. adipic acid and pimelic acid) and alicyclic dicarboxylic acids (e.g. 1,3-cyclohexanedicarboxylic acid). One type or two or more types of other dicarboxylic acids may be used.

In the constituent units derived from a dicarboxylic acid in the amorphous polyamide resin of an embodiment of the present invention, a ratio of the constituent units derived from an α,ω-straight chain aliphatic dicarboxylic acid having from 8 to 14 carbons to the constituent units derived from an aromatic dicarboxylic acid (the constituent units derived from an α,ω-straight chain aliphatic dicarboxylic acid having from 8 to 14 carbons/the constituent units derived from an aromatic dicarboxylic acid) is preferably from 0.5 to 3.5, more preferably from 0.8 to 3.2, and even more preferably from 2.0 to 3.1. Within such a range, an amorphous polyamide resin excellent in various performances can be obtained.

Embodiments of preferred amorphous polyamide resins of the present invention are described below. Of course, the present invention is not limited to these embodiments.

A first embodiment of the amorphous polyamide resin of the present invention is an amorphous polyamide resin in which not less than 90 mol % of the constituent units derived from a diamine are the constituent units derived from isophoronediamine; the constituent units derived from a dicarboxylic acid include from 30 to 80 mol % of the constituent units derived from an α,ω-straight chain aliphatic dicarboxylic acid having from 8 to 14 carbons and from 70 to 20 mol % of the constituent units derived from an aromatic dicarboxylic acid; the constituent units derived from an α,ω-straight chain aliphatic dicarboxylic acid having from 8 to 14 carbons include at least one selected from the group consisting of constituent units derived from sebacic acid and constituent units derived from dodecanedioic acid; and the constituent units derived from an aromatic dicarboxylic acid include at least one selected from the group consisting of constituent units derived from 2,6-naphthalene dicarboxylic acid and constituent units derived from isophthalic acid. In the first embodiment, aspects in which the constituent units derived from an α,ω-straight chain aliphatic dicarboxylic acid having from 8 to 14 carbons include any one of the constituent units derived from sebacic acid, the constituent units derived from dodecanedioic acid, or both are exemplified. Furthermore, in the first embodiment, aspects in which any one of the constituent units derived from 2,6-naphthalene dicarboxylic acid or the constituent units derived from isophthalic acid, or both are included are exemplified.

A second embodiment of the amorphous polyamide resin of the present invention is an aspect in which the constituent units derived from a dicarboxylic acid of the first embodiment include from 30 to 80 mol % of the constituent units derived from dodecanedioic acid and from 70 to 20 mol % of the constituent units derived from an aromatic dicarboxylic acid. In the second embodiment, "the constituent units derived from dodecanedioic acid/the constituent units derived from an aromatic dicarboxylic acid" is preferably from 2.8 to 3.2.

A third embodiment of the amorphous polyamide resin of the present invention is an aspect in which the constituent units derived from a dicarboxylic acid of the first embodiment include from 30 to 80 mol % of the constituent units derived from sebacic acid and from 70 to 20 mol % of the constituent units derived from an aromatic dicarboxylic acid. In the third embodiment, "the constituent units derived from an α,ω-straight chain aliphatic dicarboxylic acid having from 8 to 14 carbons/the constituent units derived from an aromatic dicarboxylic acid" is preferably from 0.8 to 2.5.

A fourth embodiment of the amorphous polyamide resin of the present invention is an aspect in which the constituent units derived from a dicarboxylic acid of the first embodiment include from 30 to 80 mol % of the constituent units derived from an α,ω-straight chain aliphatic dicarboxylic acid having from 8 to 14 carbons and from 70 to 20 mol % of constituent units derived from 2,6-naphthalene dicarboxylic acid. In the fourth embodiment, "the constituent units derived from dodecanedioic acid/the constituent units derived from an aromatic dicarboxylic acid" is preferably from 2.8 to 3.2.

A fifth embodiment of the amorphous polyamide resin of the present invention is an aspect in which the constituent units derived from a dicarboxylic acid of the first embodiment include from 30 to 80 mol % of the constituent units derived from an αω-straight chain aliphatic dicarboxylic acid having from 8 to 14 carbons and from 70 to 20 mol % of the constituent units derived from isophthalic acid. In the fifth embodiment, "the constituent units derived from an αω-straight chain aliphatic dicarboxylic acid having from 8 to 14 carbons/the constituent units derived from an aromatic dicarboxylic acid" is preferably from 0.8 to 3.2.

Note that the amorphous polyamide resin of an embodiment of the present invention comprises the constituent units derived from a dicarboxylic acid and the constituent units derived from a diamine but may also include a constituent unit besides the constituent unit derived from a dicarboxylic acid and the constituent unit derived from a diamine, or other moieties such as terminal groups. Examples of other constituent units include, but are not limited to, constituent units derived from lactams, such as ε-caprolactam, valerolactam, laurolactam, and undecalactam, and aminocarboxylic acids, such as 11-aminoundecanoic acid, 12-aminododecanoic acid, and the like. Furthermore, the amorphous polyamide resin of an embodiment of the present invention may include minor components such as additives used for synthesis.

In the polyamide resin used in an embodiment of the present invention, typically 95 wt. % or greater, preferably 98 wt. % or greater, and more preferably 99 wt. % or greater, is the constituent unit derived from a dicarboxylic acid or the constituent unit derived from a diamine.

The amorphous polyamide resin of an embodiment of the present invention is produced through a melt polycondensation (melt polymerization) method by adding a compound including a phosphorus atom. As the melt polycondensation method, preferable is a method in which a raw material diamine is added dropwise to a molten raw material dicarboxylic acid and heated under pressure to polymerize while condensed water is removed; or a method in which a salt formed from a raw material diamine and a raw material dicarboxylic acid is heated under pressure in the presence of water to polymerize in the molten state while added water and condensed water are removed.

Examples of the compound including a phosphorus atom added in the polycondensation system of the amorphous polyamide resin of an embodiment of the present invention include dimethylphosphinic acid, phenylmethylphosphinic acid, hypophosphorous acid, sodium hypophosphite, potassium hypophosphite, lithium hypophosphite, calcium hypophosphite, ethyl hypophosphite, phenylphosphonous acid, sodium phenylphosphonite, potassium phenylphosphonite, lithium phenylphosphonite, ethyl phenylphosphonite, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite, and pyrophosphorous acid. Among these, metal hypophosphites, such as sodium hypophosphite, potassium hypophosphite, lithium hypophosphite, and calcium hypophosphite, are preferably used due to a good effect of promoting the amidation reaction and an excellent anti-coloring effect. Calcium hypophosphite is particularly preferable. The compound including a phosphorus atom that can be used in an embodiment of the present invention is not limited to these compounds.

The amorphous polyamide resin of an embodiment of the present invention obtained by melt polycondensation is preferably removed, pelletized, and then dried and used.

The amorphous polyamide resin of an embodiment of the present invention preferably has a melt viscosity at a shear rate of 122 sec$^{-1}$ at 280° C. of 200 Pa·s or greater; and more preferably 250 Pa·s or greater. The upper limit of the melt viscosity is preferably 2300 Pa·s or less, more preferably 1000 Pa·s or less, even more preferably 600 Pa·s or less, yet even more preferably 550 Pa·s or less, and yet even more preferably 490 Pa·s or less.

The method of measuring the melt viscosity follows the method described in the examples described below. If the equipment employed in the examples is not readily available due to discontinuation of the equipment or the like, other equipment having the equivalent performance can be used. The same applies to other measurement methods described below.

The lower limit of a number average molecular weight of the amorphous polyamide resin of an embodiment of the present invention is preferably 8000 or greater; and more preferably 10000 or greater. The upper limit of the number average molecular weight is preferably 25000 or less; and more preferably 20000 or less. The method of measuring the number average molecular weight follows the method described in the examples described below.

The amorphous polyamide resin of an embodiment of the present invention has a glass transition temperature of preferably 130° C. or higher, more preferably 140° C. or higher, and even more preferably 145° C. or higher. In an embodiment of the present invention, such a high Tg can be achieved, and therefore has the advantage of having hardly reduced physical properties even under high-temperature conditions. The upper limit of the glass transition temperature is not particularly limited and, for example, is preferably 220° C. or lower or may be 200° C., and even a glass transition temperature of 170° C. or lower is practically sufficient.

The method of measuring the glass transition temperature follows the method described in the examples described below.

A weight change percentage of the polyamide resin of an embodiment of the present invention after the polyamide resin is allowed to stand in the environment at 85° C. and 85% relative humidity (RH) for 200 hours is preferably 7.0% or less; and more preferably 6.0% or less and, furthermore, may be 5.0% or less, 4.6% or less, 4.5% or less, or 4.2% or less. The lower limit of the weight change percentage is preferably 0%; however, even a lower limit of 2.0% or greater or 3.0% or greater is a practical level.

The amorphous polyamide resin of an embodiment of the present invention is a resin that does not have a definite melting point; specifically, the crystal melting enthalpy ΔHm is less than 5 J/g, preferably 3 J/g or less, and more preferably 1 J/g or less. The crystal melting enthalpy is measured in accordance with the method described in the examples below.

The amorphous polyamide resin of an embodiment of the present invention can be a polyamide resin having excellent mechanical strength.

The amorphous polyamide resin of an embodiment of the present invention has a flexural modulus in accordance with JIS K 7171 of preferably 2.10 GPa or greater; and more preferably 2.20 GPa or greater. The upper limit thereof is not particularly limited and, for example, even an upper limit of 4.00 GPa or less or 3.50 GPa or less is a practically sufficient level.

The amorphous polyamide resin of an embodiment of the present invention has a flexural strength in accordance with JIS K 7171 of preferably 100 MPa or greater, more preferably 110 MPa or greater, and even more preferably 115 MPa or greater. The upper limit is not particularly limited and, for example, an upper limit of 170 MPa or less or 150 MPa or less is practically sufficient level.

The amorphous polyamide resin of an embodiment of the present invention has a Notched charpy impact strength in accordance with JIS K 7111-1 of preferably 2.5 kJ/m$^2$ or greater, more preferably 3.0 kJ/m$^2$ or greater, and even more preferably 4.0 kJ/m$^2$ or greater. The upper limit thereof is not particularly limited and, for example, even an upper limit of 8.0 kJ/m$^2$ or less or 7.0 kJ/m$^2$ or less is a practically sufficient level.

The amorphous polyamide resin of an embodiment of the present invention can be used as a molded article formed by molding a composition including the amorphous polyamide resin of an embodiments of the present invention. The composition may consist of only one type or two or more types of the amorphous polyamide resin of embodiments of the present invention or may include other components.

As another component, polyamide resins other than the amorphous polyamide resin of an embodiment of the present invention; thermo plastic resins other than the polyamide resins; and additives, such as fillers, matting agents, heat resistant stabilizers, weather resistant stabilizers, ultraviolet absorbents, plasticizers, flame retardants, antistatic agents, anti-coloration agents, anti-gelling agents, impact modifiers, lubricants, colorants, and conductive additives, can be optionally added as necessary. Each of these additives may be one type or may be two or more types.

Specific examples of such other polyamide resins include polyamide 6, polyamide 66, polyamide 46, polyamide 6/66 (copolymer formed from a polyamide 6 component and a polyamide 66 component), polyamide 610, polyamide 612, polyamide 11, polyamide 12, MXD6 [poly(m-xylylene adipamide)], MPXD6 [poly(m-, p-xylylene adipamide)], MXD10 [poly(m-xylylene sebacamide)], MPXD10 [poly (m-, p-xylylene sebacamide)], and PXD10 [poly(p-xylylene sebacamide)]. Each of these other polyamide resins may be one type or may be two or more types.

The compounded amount of the crystalline polyamide resin in the composition including the amorphous polyamide resin of an embodiment of the present invention is preferably 5 wt. % or less, more preferably 3 wt. % or less, and even more preferably 1 wt. % or less, of the amorphous polyamide resin of the embodiment of the present invention.

The compounded amount of an amorphous polyamide resin, other than the amorphous polyamide resin of an embodiment of the present invention, in the composition including the amorphous polyamide resin of an embodiment of the present invention is preferably 5 wt. % or less, more preferably 3 wt. % or less, and more preferably 1 wt. % or less, of the amorphous polyamide resin of the embodiment of the present invention.

Examples of thermoplastic resins other than the polyamide resins include polyester resins, such as polyethylene terephthalate, polybutylene terephthalate, polyethylene naphthalate, and polybutylene naphthalate. The thermoplastic resins other than the polyamide resins may be one type or may be two or more types.

The compounded amount of the thermoplastic resin other than the polyamide resin in the composition including the amorphous polyamide resin of an embodiment of the present invention is preferably 5 wt. % or less, more preferably 3 wt. % or less, and even more preferably 1 wt. % or less, of the amorphous polyamide resin of the embodiment of the present invention.

The composition including the amorphous polyamide resin of an embodiment of the present invention can be a fiber-reinforced resin composition by blending reinforcing fibers therein. Examples of reinforcing fibers include carbon fibers and glass fibers. Examples of the fiber-reinforced resin composition include pellets obtained by melt-kneading the composition including the amorphous polyamide resin of an embodiment of the present invention and reinforcing fibers, and a prepreg in which the amorphous polyamide resin of an embodiment of the present invention is impregnated into or brought into proximity with reinforcing fibers.

The composition including the amorphous polyamide resin of an embodiment of the present invention can be molded by a known molding method such as injection molding, blow molding, extrusion molding, compression molding, stretching, and vacuum molding.

A molded article formed by molding the composition including the amorphous polyamide resin of an embodiment of the present invention can be used in various molded articles including films, sheets, thin-walled molded articles, hollow molded articles, fibers, hoses, and tubes.

The composition including the amorphous polyamide resin of an embodiment of the present invention is preferably used in engineering plastic applications. The field of use of such molded articles includes transportation equipment components such as automobiles, general mechanical parts, precision mechanical parts, electronic and electrical equipment components, OA device parts, building materials and resident related components, medical devices, leisure sporting devices, amusements, medical products, articles for daily use such as food packaging films, defense and aerospace products, and the like. Examples of an embodiment of the molded article of the present invention include housing of electronic and electrical components, sunglasses, and the like.

In particular, the molded article of an embodiment of the present invention is preferably used for applications requiring low water absorption and dimensional stability under high temperature and high humidity.

Another example of an embodiment of the molded article of an embodiment of the present invention is a single layer or multi-layer container including a layer formed from a composition including the amorphous polyamide resin of an embodiment of the present invention. Examples of the multi-layer container include a multi-layer container including a layer formed from a composition including a polyolefin resin, a layer formed from a composition including the amorphous polyamide resin of an embodiment of the present invention, and a layer formed from a composition including a polyolefin resin, in this order. Examples of the polyolefin resin include polypropylene (PP), cycloolefin polymer (COP), and cycloolefin copolymer (COC). Furthermore, an adhesive layer may be provided between a layer formed from a composition including the polyolefin resin and a layer formed from a composition including the amorphous polyamide resin of an embodiment of the present invention. Such multi-layer containers can be preferably used as food or pharmaceutical containers. Examples of pharmaceutical containers include ampoules, vials, vacuum blood collection tubes, and prefilled syringes.

EXAMPLES

The present invention is described more specifically below through examples. The materials, used amounts, proportions, details of processing, processing procedures, and the like described in the examples below may be modified, as appropriate, without departing from the spirit of the present invention. Therefore, the scope of the present invention is not limited to the specific examples described below.

Note that, in the present examples, IPDA represents isophoronediamine, 1,4-BAC represents 1,4-bis(aminomethyl)cyclohexane, DDA represents dodecanedioic acid, SA represents sebacic acid, AdA represents adipic acid, 2,6-NDCA represents 2,6-naphthalene dicarboxylic acid, and PIA represents isophthalic acid.

Example 1

Synthesis of Resin IPD12N-1

In a pressure-resistant reaction vessel having an internal volume of 50 L and equipped with a stirrer, a partial condenser, a total condenser, a pressure regulator, a thermometer, a dropping funnel and a pump, an aspirator, a nitrogen-introducing tube, a bottom drain valve, and a strand die, precisely weighed 8000 g (34.74 mol) of DDA (available from Laiyang Himount Bioproduct and Technology Co., Ltd), 2503 g (11.58 mol) of 2,6-NDCA (available from BP), 1.37 g (0.0081 mol) of calcium hypophosphite (available from Kanto Chemical Co., Inc.), and 0.6 g (0.0073 mol) of sodium acetate (available from Kanto Chemical Co., Inc.) were introduced. The inside of the reaction vessel was sufficiently purged with nitrogen and then sealed, and the temperature was raised to 180° C. under agitation while the pressure in the vessel was maintained at 0.4 MPa. After the temperature reached 180° C., a dropwise addition of 7785 g (45.71 mol) of IPDA (available from Daicel-Evonik Ltd.) stored in the dropping funnel into the raw materials in the reaction vessel was initiated. The temperature in the reaction vessel was raised to 260° C. while generated condensed water was removed from the reaction system and while the pressure in the vessel was maintained at 0.4 MPa. After the completion of the dropwise addition of IPDA, the pressure in the reaction vessel was gradually returned to normal pressure while the temperature was gradually raised to 280° C., and then the pressure inside the reaction vessel was reduced to 80 kPa using an aspirator to remove the condensed water. Agitation torque of the stirrer was observed under a reduced pressure, and agitation was terminated when a predetermined torque was reached. Then, the inside of the reaction vessel was pressurized with nitrogen, the bottom drain valve was opened, and the polymer was extruded from the strand die to form a strand and then cooled and pelletized by using a pelletizer to obtain a polyamide resin. The following evaluations were performed on the obtained polyamide resin. The results are shown in Table 1.

Measurement of Melt Viscosity

The melt viscosity of the polyamide resin was measured by using a capillograph, and using a die with a diameter of 1 mm and a length of 10 mm, under the following conditions: an apparent shear rate of 122 sec$^{-1}$, a measurement temperature of 280° C., a retention time of 6 minutes, and a moisture content of the polyamide resin of 1000 weight ppm or less. In the present example, capillograph D-1 (available from Toyo Seiki Seisaku-sho, Ltd.) was used as the capillograph.

Measurement of Glass Transition Temperature (Tg)

Using a differential scanning calorimeter (DSC), the glass transition temperature was measured when heating was performed at a temperature increase rate of 10° C./min from room temperature to 250° C., then cooling was immediately performed to room temperature or lower, and then heating was performed again at a temperature increase rate of 10° C./min from the room temperature to 250° C. in a nitrogen stream. In the present example, DSC-60 available from Shimadzu Corporation was used as the differential scanning calorimeter.

Furthermore, in accordance with JIS K 7121 and K 7122, the crystal melting enthalpy ΔHm of the polyamide resin was measured during the process of increasing the temperature.

Measurement of Number Average Molecular Weight (Mn)

In a mixed solvent of phenol/ethanol of 4/1 (volume ratio), 0.3 g of the polyamide resin was added and agitated to be completely dissolved at 25° C. Thereafter, under agitation, the inner wall of the vessel was rinsed with 5 mL of methanol, and neutralization titration was performed with 0.01 mol/L aqueous hydrochloric acid solution to determine the terminal amino group concentration [NH$_2$]. Furthermore, 0.3 g of the polyamide resin was added in benzyl alcohol and agitated to be completely dissolved at 170° C. in a nitrogen stream. Thereafter, the mixture was cooled to 80° C. or lower in a nitrogen stream. Under agitation, the inner wall of the vessel was rinsed with 10 mL of methanol, and neutralization titration was performed with 0.01 mol/L aqueous sodium hydroxide solution to determine the terminal carboxyl group concentration [COOH]. The number average molecular weight was determined from the measured terminal amino group concentration [NH$_2$] (unit: μeq/g) and the measured terminal carboxyl group concentration [COOH] (unit: μeq/g) by the following equation.

Number average molecular weight (Mn)=2000000/([COOH]+[NH$_2$])

Flexural Test

The obtained polyamide resin pellets were vacuum-dried at 120° C. (dew point: −40° C.) for 24 hours, and then 4 mm×10 mm×80 mm test pieces were prepared at a mold temperature of 100° C. and a cylinder temperature of 280° C. by using an injection molding machine (SE130DU-HP, available from Sumitomo Heavy Industries, Ltd.). Flexural modulus and flexural strength of the produced test pieces were measured by the methods in accordance with JIS K 7171. In the present example, the Bend Graph II available from Toyo Seiki Seisaku-sho, Ltd. was used as the flexural tester.

Hygrothermal Test

Weight Change Percentage

A 60 mm×60 mm×2 mm test piece prepared by the same injection molding machine and conditions as for those of the test pieces used in the flexural test described above was left to stand for 200 hours in an (hot and humid) environment at 85° C. and 85% relative humidity (RH). The weight change percentage was determined as follows. Weight change percentage=[(Weight of test piece after placing under hot and humid conditions−weight of test piece before placing under hot and humid conditions)/weight of test piece before placing under hot and humid conditions]×100 (unit: %)

Appearance

A test piece that was the same as the 60 mm×60 mm×2 mm test piece prepared using the injection molding machine and conditions used in the flexural test described above was left to stand for 200 hours in an (hot and humid) environment at 85° C. and 85% relative humidity (RH). Then, the test pieces were visually evaluated as follows. A is the best. B and C are inferior in this order.

A: No deformation and cracking were observed.
B: Cracking was observed.
C: Deformation was observed.

Charpy Impact Strength

The same test piece as the test piece used for the flexural test was processed in accordance with JIS K 7144 into a notched test piece. For the obtained test piece, the notched charpy impact strength was measured in accordance with JIS K 7111-1.

Examples 2 to 6 and Comparative Examples 1 to 4

In Example 1, the diamines and dicarboxylic acids that are raw materials of the polyamide resin were changed as shown in Table 1, and each polyamide resin was synthesized.

Evaluation was performed in the same manner as in Example 1. However, the melt viscosity of Comparative Example 1 was measured by changing the temperature from 280° C. to 285° C. The results are shown in Table 1.

TABLE 1

| | | | Example 1 IPD12N-1 | Example 2 IPD12N-2 | Example 3 IPD12I | Example 4 IPD10I-1 | Example 5 IPD10I-2 | Example 6 IPD10I-3 |
|---|---|---|---|---|---|---|---|---|
| Diamine | IPDA | mol % | 100 | 100 | 100 | 100 | 100 | 100 |
| | 1,4-BAC | mol % | | | | | | |

TABLE 1-continued

|  |  |  |  |  |  |  |  |  |
|---|---|---|---|---|---|---|---|---|
| Dicarboxylic acid | DDA | mol % | 75 | 50 | 75 |  |  |  |
|  | SA | mol % |  |  |  | 70 | 50 | 36 |
|  | AdA | mol % |  |  |  |  |  |  |
|  | 2,6-NDCA | mol % | 25 | 50 |  |  |  |  |
|  | PIA | mol % |  |  | 25 | 30 | 50 | 64 |
| Melt viscosity (280° C., 122 sec$^{-1}$) |  | Pa · s | 477 | 2210 | 259 | 272 | 501 | 1881 |
| Tg |  | ° C. | 150 | 186 | 146 | 161 | 185 | 203 |
| Mn |  |  | 17000 | 14300 | 15500 | 14700 | 10400 | 13300 |
| Flexural test | Modulus of elasticity | GPa | 2.26 | 2.67 | 2.24 | 2.48 | 2.87 | 3.12 |
|  | Strength | MPa | 120 | 144 | 123 | 136 | 128 | 139 |
| Hygrothermal test 85° C./85% RH | Weight change percentage | % | 3.58 | 4.04 | 3.73 | 4.52 | 4.98 | 5.62 |
|  | Appearance evaluation |  | A | A | A | A | B | B |
| Charpy impact strength (notched) |  | kJ/m$^2$ | 4.6 | 6.0 | 4.4 | 2.8 | 2.9 | 3.2 |

|  |  |  | Comparative Example 1 IPD6I-1 | Comparative Example 2 IPD12 | Comparative Example 3 IPD/1,4-BAC10I | Comparative Example 4 IPD6I-2 |
|---|---|---|---|---|---|---|
| Diamine | IPDA | mol % | 100 | 100 | 30 | 100 |
|  | 1,4-BAC | mol % |  |  | 70 |  |
| Dicarboxylic acid | DDA | mol % |  | 100 | 50 |  |
|  | SA | mol % |  |  |  |  |
|  | AdA | mol % | 80 |  |  | 75 |
|  | 2,6-NDCA | mol % |  |  | 50 |  |
|  | PIA | mol % | 20 |  |  | 25 |
| Melt viscosity (280° C., 122 sec$^{-1}$) |  | Pa · s | 156 | 126 | 966 | 141 |
| Tg |  | ° C. | 182 | 124 | 133 | 184 |
| Mn |  |  | 11600 | 16800 | 19300 | 8000 |
| Flexural test | Modulus of elasticity | GPa | 3.23 | 2.00 | 2.13 | Test piece could not be produced |
|  | Strength | MPa | 137 | 104 | 121 |  |
| Hygrothermal test 85° C./85% RH | Weight change percentage | % | 7.32 | 3.66 | 5.11 |  |
|  | Appearance evaluation |  | B | C | C |  |
| Charpy impact strength (notched) |  | kJ/m$^2$ | 2.4 | 4.1 | 6.3 |  |

As is clear from the above results, the amorphous polyamide resins of embodiments of the present invention exhibited small weight change percentages even after being placed in the condition at 85° C. and 85% relative humidity (under hot and humid conditions), and especially, the weight change percentages can be 5 wt. % or less. Furthermore, the molded articles formed from the amorphous polyamide resins maintained a good appearance without deformation of the molded articles even after being placed under hot and humid conditions.

Furthermore, the melt viscosities of the amorphous polyamide resins of embodiments of the present invention were low, and especially, the melt viscosities at 280° C. can be 200 Pa·s or greater. Furthermore, the amorphous polyamide resins of embodiments of the present invention had high glass transition temperatures, and especially, the glass transition temperatures can be 130° C. or higher.

Furthermore, the molded articles formed from the amorphous polyamide resins of embodiments of the present invention also had excellent mechanical strengths, such as flexural strength and Charpy impact strength.

In contrast, in the case where the aliphatic chain of the constituent units derived from an α,ω-straight chain aliphatic dicarboxylic acid was short (Comparative Example 1), the obtained polyamide resin had a large weight change percentage after being placed under hot and humid conditions. In this test, the weight change percentage of the test piece correlates with the dimensional change percentage, and since the test piece swells due to water absorption, if the weight change percentage is large, the dimensional change percentage of the test piece also increases. Therefore, it was found that the molded articles formed from such polyamide resins had poor dimensional stability. Furthermore, in the case where the constituent units derived from a dicarboxylic acid were formed from 75 mol % of adipic acid and 25 mol % of isophthalic acid (Comparative Example 4), the impact resistance was remarkably poor, and injection molding was difficult.

Furthermore, in the case where the constituent unit derived from an aromatic dicarboxylic acid was not included (Comparative Example 2), it was found that the flexural strength of the molded article formed from the obtained polyamide resin was poor, and the appearance thereof was poor after the molded article was placed under hot and humid conditions.

Furthermore, it was found that the constituent units derived from a diamine included greater than 30 mol % of constituent units other than the constituent unit derived from isophorone diamine (Comparative Example 3) had a large weight change percentage after being placed under hot and humid conditions, and the molded article formed from the polyamide resin had poor appearance.

Furthermore, it was found that the polyamide resins of Examples 1 to 6 and Comparative Examples 1 to 4 had crystal melting enthalpies ΔHm of substantially 0 J/g in the process of increasing temperature, and these were amorphous polyamide resins.

Chemical Resistance Test (flexural Test Strength Retention Ratio)

For the polyamide resin obtained in Example 3, test pieces were prepared in accordance with the flexural test described above. The resulting test pieces were each immersed in a chemical agent at 23° C. Toluene, xylene, aqueous sulfuric acid solution (10 wt. %), aqueous sodium hydroxide solution (10 wt. %), and aqueous calcium chloride solution (10 wt. %) were each used as the chemical agent.

The strength measurement by flexural test was performed for each specimen at day 1, day 7, day 30, day 60, day 90, and day 180 after immersion. The strength retention ratio was calculated as follows.

Strength retention ratio=[(flexural test of test piece immersed in a chemical agent)/flexural test of test piece prior to immersion in a chemical solvent]×100 (unit: %)

Furthermore, the same procedure, except that the polyamide resin was replaced with Grilamid TR 55 (available from EMS-CHEMIE Ltd.) or Grilamid TR 90 (available from EMS-CHEMIE Ltd.), was conducted and the results were compared.

Grilamid TR 55 is a polycondensate of isophthalic acid/bis(3-methyl-4-aminocyclohexyl)methane/w-laurolactam (available from EMS-CHEMIE Ltd.), and Grilamid TR 90 is a polycondensate of dodecanedioic acid/bis(3-methyl-4-aminocyclohexyl)methane.

Figure 2:
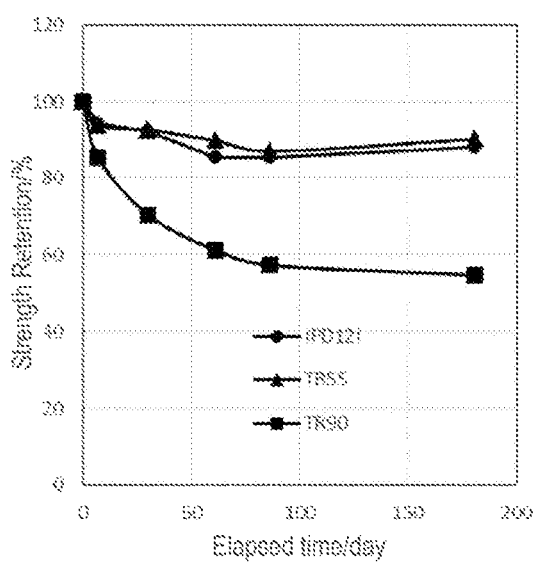
FIG. 2 are diagrams showing chemical resistance to xylene and a sulfuric acid aqueous solution.
Figure 2:
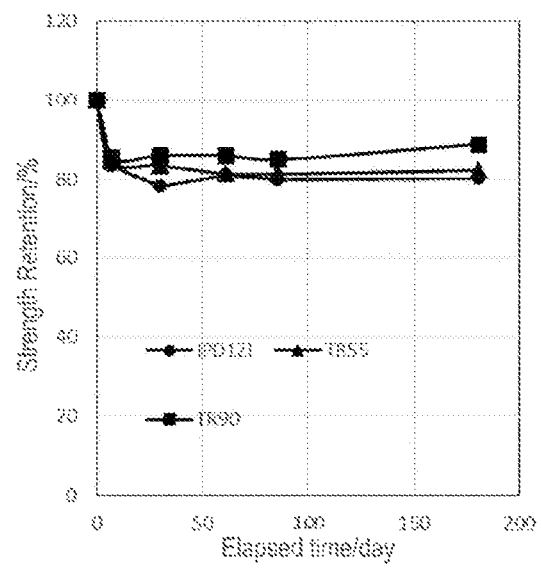
Figure 3:
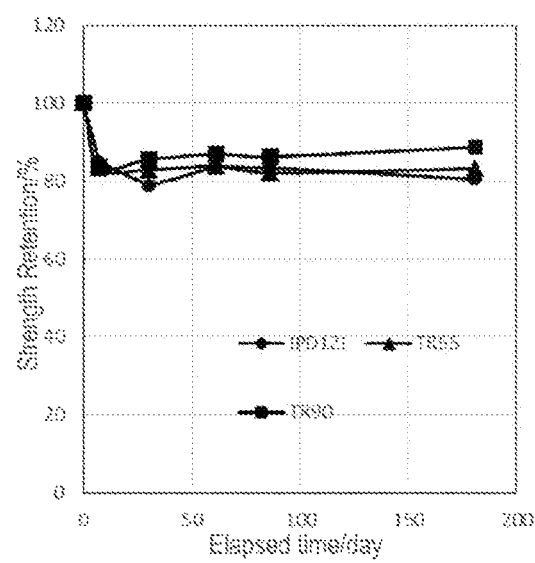
FIG. 3 are diagrams showing chemical resistance to a sodium hydroxide aqueous solution and a calcium chloride aqueous solution.
Figure 3:
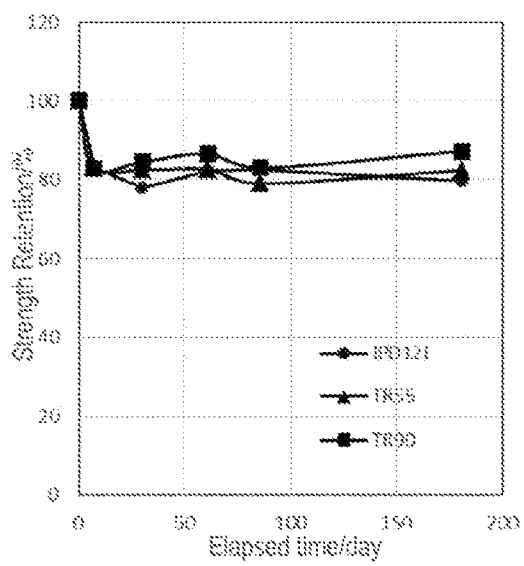

The results of the chemical resistance are shown in FIGS. 1 to 3. For all the chemical agents, the test pieces of the embodiment of the present invention achieved the same or better performance compared to those of Grilamid TR 55 and Grilamid TR 90.

The invention claimed is:

1. A molded article obtainable by molding a composition comprising an amorphous polyamide resin and a reinforcing fiber, the amorphous polyamide resin comprising constituent units derived from a diamine and constituent units derived from a dicarboxylic acid,
wherein not less than 70 mol % of the constituent units derived from a diamine are constituent units derived from isophoronediamine and the constituent units derived from a dicarboxylic acid include from 45 mol % to less than 80 mol % of the constituent units derived from an α,ω-straight chain aliphatic dicarboxylic acid having from 8 to 14 carbons and from more than 20 mol % to 55 mol % or less of the constituent units derived from an aromatic dicarboxylic acid.

2. A composition comprising an amorphous polyamide resin and a reinforcing fiber, the amorphous polyamide resin comprising constituent units derived from a diamine and constituent units derived from a dicarboxylic acid,
wherein not less than 70 mol % of the constituent units derived from a diamine are constituent units derived from isophoronediamine and the constituent units derived from a dicarboxylic acid include from 45 mol % to less than 80 mol % of the constituent units derived from an α,ω-straight chain aliphatic dicarboxylic acid having from 8 to 14 carbons and from more than 20 mol % to 55 mol % or less of the constituent units derived from an aromatic dicarboxylic acid.

3. The composition according to claim 2, wherein the composition is in pellet form.

4. The composition according to claim 2, wherein the constituent units derived from an α,ω-straight chain aliphatic dicarboxylic acid having from 8 to 14 carbons include at least one selected from the group consisting of constituent units derived from sebacic acid and constituent units derived from dodecanedioic acid.

5. The composition according to claim 2, wherein the constituent units derived from an aromatic dicarboxylic acid include at least one selected from the group consisting of constituent units derived from 2,6-naphthalene dicarboxylic acid and constituent units derived from isophthalic acid.

6. The composition according to claim 2, wherein not less than 90 mol % of the constituent units derived from a diamine are the constituent units derived from isophoronediamine;
the constituent units derived from an α,ω-straight chain aliphatic dicarboxylic acid having from 8 to 14 carbons include at least one selected from the group consisting of constituent units derived from sebacic acid and constituent units derived from dodecanedioic acid; and
the constituent units derived from an aromatic dicarboxylic acid include at least one selected from the group consisting of constituent units derived from 2,6-naphthalene dicarboxylic acid and constituent units derived from isophthalic acid.

7. The composition according to claim 2, wherein, in the constituent units derived from a dicarboxylic acid, a ratio of the constituent units derived from an α,ω-straight chain aliphatic dicarboxylic acid having from 8 to 14 carbons to the constituent units derived from an aromatic dicarboxylic acid (the constituent units derived from an α,ω-straight chain aliphatic dicarboxylic acid having from 8 to 14 carbons/the constituent units derived from an aromatic dicarboxylic acid) is from 0.5 to 3.5.

8. The composition according to claim 2, wherein the amorphous polyamide resin has a glass transition temperature of the amorphous polyamide resin of from 130 to 220° C.

9. The composition according to claim 2, wherein the amorphous polyamide resin has a notched charpy impact strength in accordance with JIS K 7111-1 of 2.5 kJ/m$^2$ or greater.

10. The composition according to claim 2, wherein the amorphous polyamide resin has a melt viscosity measured at a shear rate of 122 sec$^{-1}$ and a measurement temperature of 280° C. of from 200 to 2300 Pa·s.

11. The composition according to claim 2, wherein the reinforcing fiber is carbon fibers and/or glass fibers.

12. The molded article according to claim 1, which is engineering plastic article.

13. The molded article according to claim 1, which is selected from the group consisting of equipment components, general mechanical parts, precision mechanical parts, electronic and electrical equipment components, OA device parts, building materials, resident related components, medical devices, leisure sporting devices, amusements, medical products, and articles for daily use.

14. A method for manufacturing a molded article, which comprises molding a composition comprising an amorphous polyamide resin and a reinforcing fiber by injection molding, blow molding, extrusion molding, compression molding, or vacuum molding, the amorphous polyamide resin comprising constituent units derived from a diamine and constituent units derived from a dicarboxylic acid,
wherein not less than 70 mol % of the constituent units derived from a diamine are constituent units derived from isophoronediamine and the constituent units derived from a dicarboxylic acid include from 45 mol % to less than 80 mol % of the constituent units derived from an α,ω-straight chain aliphatic dicarboxylic acid having from 8 to 14 carbons and from more than 20 mol % to 55 mol % or less of the constituent units derived from an aromatic dicarboxylic acid.

15. The method for manufacturing a molded article according to claim 14, wherein the constituent units derived from a dicarboxylic acid include from 25 mol % to 55 mol % of the constituent units derived from an aromatic dicarboxylic acid.

16. The molded article according to claim 1, wherein the constituent units derived from a dicarboxylic acid include from 25 mol % to 55 mol % of the constituent units derived from an aromatic dicarboxylic acid.

17. The composition according to claim 2, wherein the constituent units derived from a dicarboxylic acid include from 25 mol % to 55 mol % of the constituent units derived from an aromatic dicarboxylic acid.

\* \* \* \* \*